UNITED STATES PATENT OFFICE.

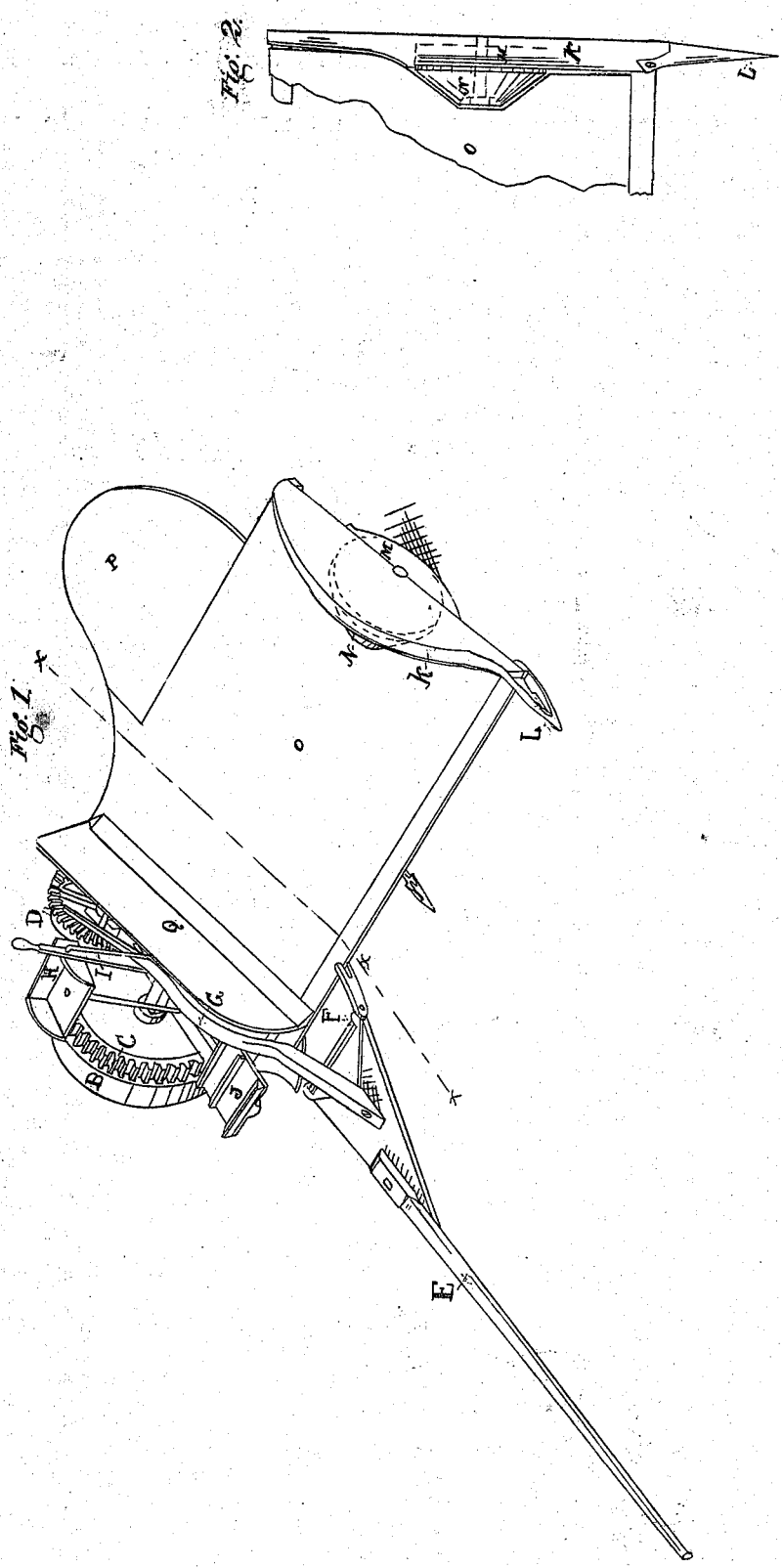

WALTER A. WOOD, OF HOOSICK FALLS, NEW YORK.

IMPROVEMENT IN GRAIN AND GRASS HARVESTERS.

Specification forming part of Letters Patent No. 12,570, dated March 20, 1855.

*To all whom it may concern:*

Be it known that I, WALTER A. WOOD, of Hoosick Falls, in the county of Rensselaer and State of New York, have invented certain new and useful Improvements in Reaping-Machines; and I do hereby declare the following to be a full, clear, and exact description of the same, reference being had to the accompanying drawings, making a part thereof, in which—

Figure 1 represents a perspective view of the reaper. Fig. 2 represents a detached portion thereof.

Similar letters, where they occur in both figures, denote like parts.

The nature of my invention consists in making the inner face of the supporting-wheel conical, for the purpose of causing it to act as a track-clearer for the return-swath, and also in forming upon the platform a space between the cutting-point at that end of the machine next the driving-wheel and the frame sufficient to contain as much cut grain as will make a bundle or sheaf before it is raked therefrom by the operator.

To enable others skilled in the art to make and use my invention, I will proceed to describe the same with reference to the drawings, confining the description to those parts especially which I deem new.

The frame of the machine is made in any of the usual well-known ways, with a main diving and supporting wheel, B, thereon, which has a tier of cogged teeth, C, on its inner face, which work into a pinion on the same shaft that carries the bevel-gear wheel D, which in turn works into a bevel-spur on a crank-shaft that vibrates the cutter-bar. Any other equally well known means of vibrating said bar may be used.

E is the tongue, hinged to the machine at F.

G is a lever attached to the tongue and extending backward to near the driver's seat H, where it passes through another lever, I, connected by a pivot-joint to the main frame of the machine.

J is the foot-board for the driver to brace against in retaining his seat.

By operating the lever I the front of the machine may be raised or lowered at pleasure.

K is a piece forming the frame at that end of the machine which runs in the standing grain, and is provided with the customary shoe, L. The supporting-wheel M is hung on the piece K, which covers almost the entire wheel, except its inner face, as seen in Fig. 2, to keep the cut grain from winding or entangling thereon. The inner face, N, of the wheel M is in the form of a truncated cone, which as it rolls along in contact with the cut grass forces it out of the line of the track of said conical part, so that a track will be cleared by it for the part of the machine which runs over this track upon the return-swath when the machine is converted into a mower and the platform removed.

I am aware that a cone separate from the supporting-wheel, and which revolves on an axis parallel with the line of motion of the reaper, has been used, and of course I do not claim such a conical track-clearer, my invention resting upon the making of the cone on the supporting-wheel, which must of necessity have motion, and by this means I dispense with several pieces of machinery and get equally as good a result.

O is the platform upon which the cut grain falls, and this platform may be extended rearward by an additional piece, P, on which a seat or support for the operator may be placed. The black line $xx$, Fig. 1, represents about the line of the cutters at that end of the machine, or, in other words, the line of the standing grain. Between that line $xx$ and the side frame, Q, there is a space left into which the operator rakes the grain from the platform, as it is cut and dropped thereon, until enough is accumulated to form a sheaf or bundle, when it is raked off onto the ground in rear of the machine for the binders. The so arranging and disposing of the several parts of the machine as to preserve this space without detriment to the machine is what I claim in this part of my invention; and I would here take occasion to remark that small as these things may apparently seem they were only contrived after repeated experiments, and have proven themselves highly valuable in practice; and it should, moreover, be borne in mind that although reaping-machines have been known for fifty years they have been impracticable until within a very few years, and only since the details of the machine have been perfected have they been entirely successful, the principle remaining unchanged.

Having thus fully described the nature of my invention, I would state that I am aware that a conical track-clearer separate and independent of the bearing-wheel has been used in mowing-machines. This I do not claim; but

What I do claim as new, and desire to secure by Letters Patent, is—

1. Making the inner face of the supporting-wheel conical, for the purpose of clearing the track for the next or return swath of the machine, as described.

2. I do not claim a reserved space in general on the platform between the end of the cutting-point and the frame; but what I do claim is the forming of a quadrangular space on the platform between the end of the cutting-point and the frame of the machine sufficient to hold as much grain as will make a bundle or sheaf before it is raked from the machine, as described.

WALTER A. WOOD.

Witnesses:
A. B. STOUGHTON,
THOS. H. UPPERMAN.